(12) United States Patent  
Yamamoto

(10) Patent No.: US 6,700,675 B1  
(45) Date of Patent: Mar. 2, 2004

(54) IMAGE FORMATION APPARATUS THAT CAN ENSURE PROVISION OF SHEETS FOR IMAGE FORMATION ACCORDING TO EXTERNAL IMAGE DATA

(75) Inventor: Hiranaga Yamamoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/411,989

(22) Filed: Oct. 4, 1999

(30) Foreign Application Priority Data

Oct. 9, 1998 (JP) .......................................... 10-287589

(51) Int. Cl.$^7$ ........................ G06F 15/00; G03G 15/00; G08B 21/00; B65H 7/02; H04N 5/91
(52) U.S. Cl. ...................... 358/1.15; 358/1.9; 358/1.15; 399/18; 399/87; 399/82; 340/540; 271/265.01; 386/77
(58) Field of Search ................................ 358/1.13–1.16, 358/1.12; 399/18, 8, 87; 340/540; 271/265.01; 386/77

(56) References Cited

U.S. PATENT DOCUMENTS

| | | | | |
|---|---|---|---|---|
| 4,206,483 A | * | 6/1980 | Nakamura ................... | 386/77 |
| 4,476,486 A | | 10/1984 | Ayata et al. | |
| 4,727,435 A | | 2/1988 | Otani et al. | |
| 4,797,706 A | | 1/1989 | Sugishima et al. | |
| 5,119,472 A | | 6/1992 | Ogawa | |
| 5,594,529 A | * | 1/1997 | Yamashita et al. ............. | 399/8 |
| 5,629,672 A | * | 5/1997 | Brown et al. ................ | 340/540 |
| 5,640,232 A | | 6/1997 | Miyake et al. | |
| 5,774,639 A | * | 6/1998 | Schildkraut et al. ......... | 358/1.16 |
| 5,915,690 A | * | 6/1999 | Surya ..................... | 271/265.01 |
| 5,966,555 A | * | 10/1999 | Nakajima et al. ............. | 399/18 |
| 6,125,249 A | * | 9/2000 | Ootsuka et al. ............... | 399/87 |

FOREIGN PATENT DOCUMENTS

| | | |
|---|---|---|
| EP | 0 613 287 A1 | 8/1994 |
| EP | 0 643 526 A1 | 3/1995 |

OTHER PUBLICATIONS

European Search Report dated Mar. 14, 2003.

* cited by examiner

*Primary Examiner*—Mark Wallerson
*Assistant Examiner*—Saeid Ebrahimi
(74) *Attorney, Agent, or Firm*—David G. Conlin; Steven M. Jensen; Edwards & Angell, LLP

(57) ABSTRACT

An image formation apparatus to ensure provision of sheets used in a host mode process and a guest mode process without increasing the number of sheet cassettes to be mounted at a sheet feed unit and to prevent tedious task due to increase in the sheet feed frequency is provided. In the image formation apparatus, the main CPU identifies the accommodated number of sheets n in the sheet cassette every time one copy mode image formation process ends. This value n is compared with a set value of the number of sheets N read out via a sub CPU. When value n is equal to or less than value N, the copy mode image formation process is interrupted until the sheet cassette is replenished with sheets while waiting for input of image data associated with the guest mode image formation process. When image data associated with the guest mode image formation process is input from an external device during this period, the guest mode image formation process is executed.

15 Claims, 15 Drawing Sheets

FIG. 9A

| TIME ZONE | CORRECTION VALUE $\alpha$ |
|---|---|
| 8 : 00 ~ 9 : 59 | 2 / 6 |
| 10 : 00 ~ 15 : 59 | 1 / 6 |
| 16 : 00 ~ 18 : 59 | 2 / 6 |
| 19 : 00 ~ 7 : 59 | 1 / 6 |

FIG. 9B

| DAY | CORRECTION VALUE $\beta$ |
|---|---|
| MONDAY | 1 . 5 |
| TUESDAY | 1 . 0 |
| WEDNESDAY | 1 . 0 |
| THURSDAY | 1 . 0 |
| FRIDAY | 1 . 5 |
| SATURDAY | 0 . 7 |
| SUNDAY | 0 . 7 |

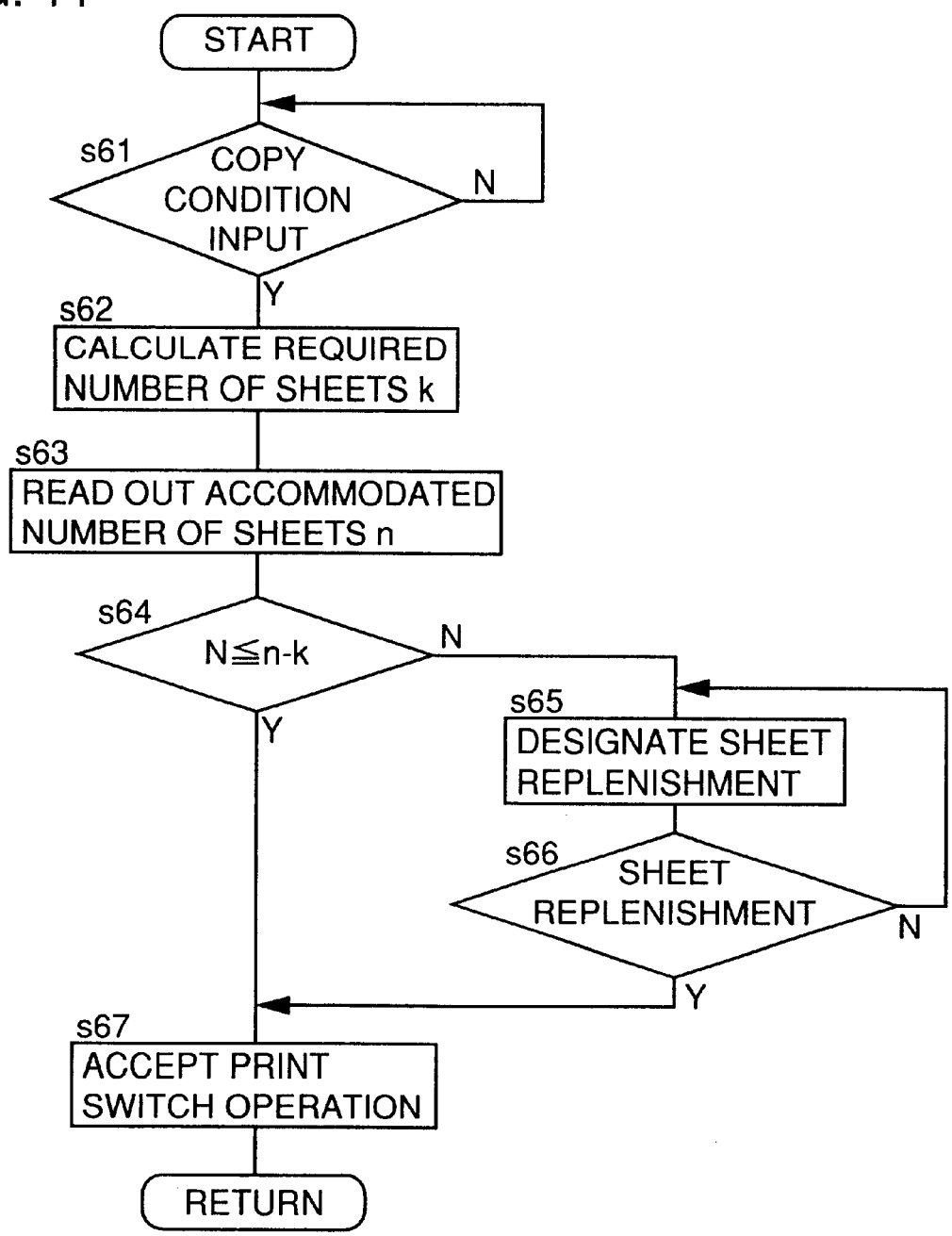

IMAGE FORMATION APPARATUS THAT CAN ENSURE PROVISION OF SHEETS FOR IMAGE FORMATION ACCORDING TO EXTERNAL IMAGE DATA

BACKGROUND OF THE INVENTION

1. Field of the Invention

The present invention relates to an image formation apparatus such as a digital copy machine that can selectively execute an image formation process of a host mode to form an image on a sheet according to image data applied from a specific image input device and an image formation process of a guest mode to form an image on a sheet according to image data applied from a device other than the specific image input device.

2. Description of the Background Art

In an image formation apparatus that forms an image on a sheet according to image data applied from an image input device, the image formation process is carried out by a host mode according to image data applied from a specific image input device arranged inside or in the proximity of the image formation apparatus, as well as by a guest mode according to image data applied from an external image input device connected through a data transmission line.

For example, in a digital copy machine including the facsimile function, a facsimile mode process is executed to form on a sheet an image transmitted from an external facsimile apparatus via a public switched telephone network, in addition to the copy mode process of copying on a sheet an image of an original document read out by an internal image reader. Some other multi-function digital copy machines receive an image input produced by an external personal computer or read out by a scanner to execute a print mode process of forming the input image on a sheet.

In the above multi-function digital copy machine, the sheet on which an image is to be formed must be provided reliably in executing the process of each mode. In the host mode, the operator can confirm the presence of a sheet in the sheet feed unit of the digital copy machine in the copy mode process to replenish the sheet feed unit with sheets when in the case of shortage. In the process of the facsimile mode or a printer mode corresponding to the guest mode, there are cases where the operator of the external device such as the facsimile apparatus or personal computer cannot confirm the presence/absence of the sheet in the sheet feed unit.

In the case where the sheet required for execution of the guest mode process is not accommodated in the sheet feed unit of the digital copy machine, the required sheet may not be promptly supplied. The process will be deferred. Particularly in the case where the same sheet feed unit is shared by a plurality of mode processes, the remaining number of sheets in the sheet feed unit may often be insufficient at the initiation of the guest mode process due to the usage of many sheets in the host mode process.

A copy machine with a facsimile function disclosed in Japanese Patent Laying-Open No. 7-250190 has a structure in which at least one sheet cassette out of a plurality of sheet feed trays (referred to as "cassette" appropriately hereinafter) can be set as the cassette directed to facsimile recording. Sheets are supplied from different sheet cassettes between the copy mode process and the facsimile mode process. This ensures the provision of sheets to be used in a facsimile mode process from the dedicated sheet cassette even when a great number of sheets are used in the copy mode process.

However, it will become necessary to mount a plurality of sheet cassettes each accommodating sheets of various sizes for each mode at the sheet feed unit if a sheet cassette accommodating the sheets to be used in the facsimile mode process corresponding to the guest mode is provided in addition to the sheet cassette accommodating the sheets to be used in the copy mode process corresponding to the host mode as in the above apparatus of Japanese Patent Laying-Open No. 7-250190. There was a problem that the entire size of the apparatus is increased.

Also, it is to be noted that the ratio of the accommodated number of sheets that can be used for the copy mode process of high usability to the total number of accommodated sheets in the sheet feed unit is reduced. As a result, the sheets remaining in the sheet cassette set exclusively for the facsimile mode will not be able to be used for the copy mode process even if the number of sheets to be used in the facsimile mode process is significantly lower than the number of sheets to be used in the copy mode process. There was a disadvantage that the frequency of sheet replenishment is increased to render the task of the copy mode process tedious.

In the host mode process, the sheet cassette dedicated to the host mode can be easily replenished since the operator is usually present in the proximity of the apparatus. However, in the guest mode process where the operator is not present in the proximity of the apparatus, the sheets cannot be promptly supplied for replenishment when the accommodated number of sheets in the sheet cassette dedicated to the guest mode becomes low after repetitive execution of the guest mode process or the usage of a large amount of sheets in the previous guest mode process. There is a possibility that the succeeding guest mode process cannot be executed.

The above problems are encountered, not only in the multi-function type digital copy machine, but also in printers connected to a particular personal computer or to an external facsimile apparatus or another personal computer that is connected to a public switched telephone network.

SUMMARY OF THE INVENTION

An object of the present invention is to provide an image formation apparatus that can ensure provision of sheets to be used in a host mode process and a guest mode process without increasing the number of sheet cassettes mounted at the sheet feed unit, and that does not have the process task rendered complicated as a result of frequent sheet supply by switching the state of the sheet cassette dedicated to the guest mode with respect to the accommodated number of sheets in the sheet cassette.

According to an aspect of the present invention, an image formation apparatus selectively executes an image formation process of either a host mode according to image data input from a particular device or a guest mode according to image data input from a device other than the particular device with respect to the sheet accommodated at the sheet feed position.

In the present image formation apparatus, the guest mode dedicated set state of using the sheet accommodated at the sheet feed position only for the image formation process of the guest mode can be altered according to the result of comparing the accommodated number of sheets at the sheet feed position and the number of sheets to be ensured for provision in the guest mode.

In the present invention, the set state dedicated to the guest mode as to the sheet feed position is altered according to the result of comparing the accommodated number of sheets at the sheet feed position with the number of sheets to be ensured for provision in the guest mode. Therefore, the sheet feed position dedicated to the guest mode is not fixedly set. The sheets accommodated at the sheet feed position can be used efficiently in the image formation processes of both the host mode and the guest mode according to the usage state of the sheet.

When the accommodated number of sheets at a unitary or plurality of sheet feed positions becomes as low as a set value of the number of sheets to be ensured for provision as to the guest mode in the image formation apparatus of the present aspect, that sheet feed position is set as the sheet feed position dedicated to the guest mode.

When sheets are used in the image formation process of the host mode or the guest mode in the image formation apparatus of the present aspect so that the accommodated number of sheets at the sheet feed position becomes as low as the set number of sheets to be ensured for provision in the image formation process of the guest mode, that sheet feed position is set as the sheet feed position dedicated to the guest mode. Therefore, a plurality of sheets corresponding to the set number of sheets to be ensured for provision in the guest mode image formation process subtracted from the initial number of accommodated sheets at the sheet feed position is to be used for the image formation process of the host mode and the guest mode. The set number of sheets to be ensured for provision in the guest mode image formation process is used only for the image formation process of the guest mode. Therefore, provision of a sufficient number of sheet can always be ensured for the image formation process of the guest mode in which the operator generally cannot easily replenish the supply unit with sheets.

Preferably in the image formation apparatus, the setting of the sheet feed position dedicated to the guest mode can be switched to another sheet feed position when the accommodated number of sheets at the sheet feed position set exclusively for the guest mode among the unitary or plurality of sheet feed positions become as low as the set number of sheets to be ensured for provision in the guest mode image formation process.

When the accommodated number of sheets at the sheet feed position dedicated to the guest mode is used in the guest mode image formation process to become as low as the set number of sheets, the remaining sheets are used only for the host mode image formation process, and another sheet feed position is set as the sheet feed position dedicated to the guest mode. Therefore, the sheet feed position reduced in the accommodated number of sheets is to be used for the host mode image formation process in which sheet replenishment can be carried out readily, and the sheet feed position where more sheets are accommodated is to be used for the guest mode image formation process in which sheet replenishment cannot be carried out readily.

Preferably in the image formation apparatus, the set number of sheets to be ensured for provision in the guest mode image formation process can be set variable according to the time zone.

In the present image formation apparatus, the setting for the guest mode as to the sheet feed position is altered on the basis of a different set value of the number of sheets according to the time zone. Therefore, even in the case where the number of sheets used in the guest mode image formation process changes according to the time zone, the sheets accommodated at the sheet feed position are to be used in the host mode image formation process within the constantly ensured range of a sufficient number of sheets for the guest mode image formation process whatever time zone it may be.

In the image formation apparatus, the set number of sheets to be ensured for provision in the guest mode image formation process is preferably variable according to the day of a week such as a weekday or a weekend day.

In the image formation apparatus, the setting dedicated to the guest mode as to the sheet feed position can be altered on the basis of a different set value of the number of sheets according to the day of the week. Therefore, even in the case where the number of sheets used for the guest mode image formation process differs according to the day of the week, the sheets accommodated at the sheet feed position can be used for the host mode image formation process within the range of a sufficient number of sheets always ensured for the guest mode image formation process whatever day of the week it may be.

Prior to initiation of a host mode image formation process, the number of sheets to be used in the host mode image formation process is subtracted from the accommodated number of sheets at the sheet feed position, and sheet replenishment for a sheet feed position is designated according to the result of comparison between the subtracted value and the set value of the number of sheets to be ensured for provision in the guest mode image formation process.

Prior to initiation of a host mode image formation process, determination is made whether the accommodated number of sheets after execution of the host mode image formation process will become lower than the set number of sheets to be ensured for provision in the guest mode image formation process. Designation is made to carry out sheet replenishment according to the determination result. Therefore, in the case where the accommodated number of sheets will become lower than the number of sheets set to be ensured for the guest mode image formation process if the host mode image formation process is executed, sheets can be reliably supplied for replenishment prior to initiation of the host mode image formation process. A sufficient number of sheets can be ensured for provision as to the guest mode image formation process.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 9A and 9B show examples of correction values used in the timer interruption process of the digital copy machine of FIG. 8.

FIG. 11 is a flow chart showing partially the procedure by the control unit of a digital copy machine according to a third embodiment of the present invention.

DESCRIPTION OF THE PREFERRED EMBODIMENTS

Figure 1:
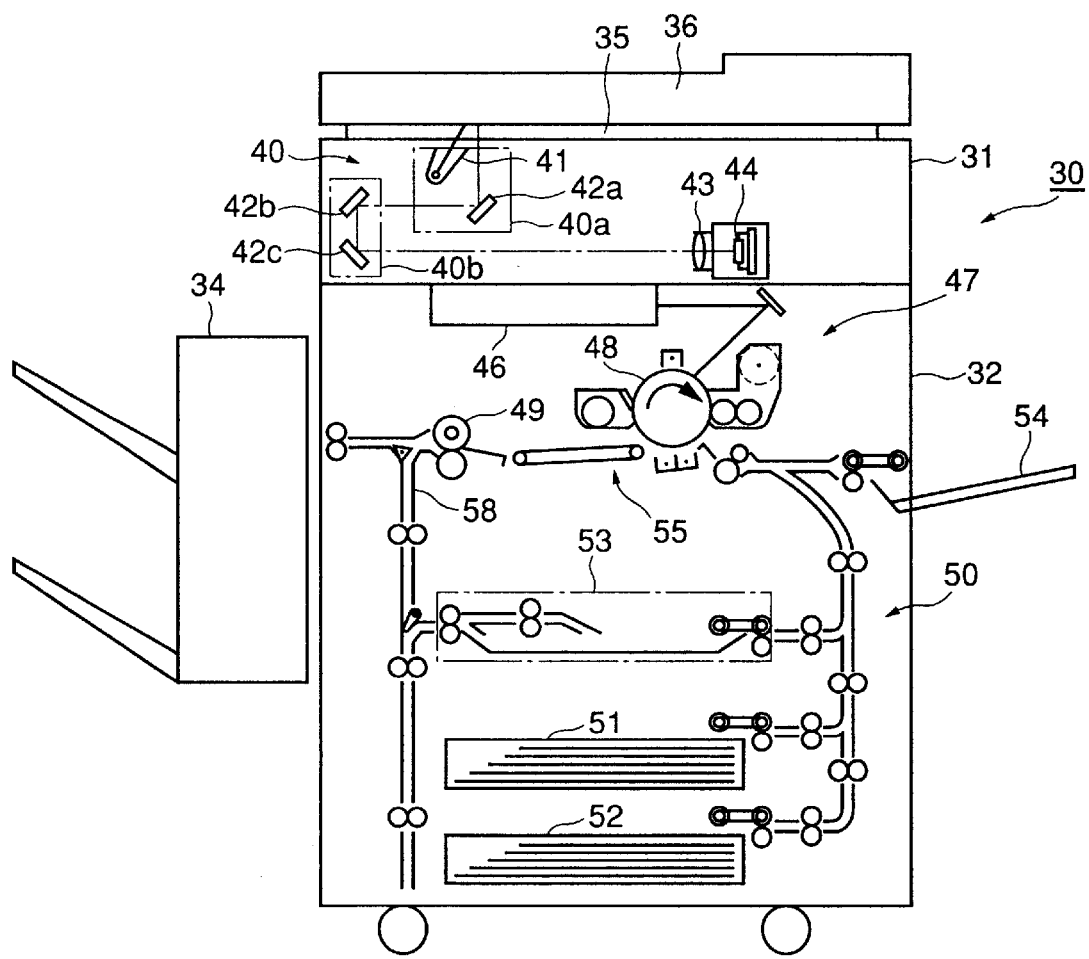
FIG. 1 is a schematic front sectional view showing a structure of a digital copy machine which is an image formation apparatus according to an embodiment of the present invention.

FIG. 1 is a schematic front sectional view showing a structure of a digital copy machine which is an image formation apparatus according to an embodiment of the present invention. A digital copy machine 30 is constituted by a scanner device 31 and a laser record unit 32. Scanner device 31 includes a document platen 35 of transparent glass, an automatic document feeder 36 for feeding a document one at a time onto document platen 35, and a scanner unit 40 reading the image of the document placed on document platen 35. Automatic document feeder 36 includes a document transportation path to feed the plurality of documents set on a document tray not shown so that one side or both sides of the document face the top surface of document platen 35 according to the operator's selection.

Scanner unit 40 includes an exposure lamp 41 and a mirror 42a mounted at a mirror base 40a, mirrors 42b and 42c and a lens 43 mounted at a mirror base 40b, and a photoelectric conversion element 44. Mirror base 40a reciprocates under and in parallel to document platen 35, whereby the image plane of the document placed on document platen 35 is scanned by the light of exposure lamp 41 during the forward movement. Mirror base 40b moves in a direction identical to that of mirror base 40a and at ½ the rate of mirror base 40a. The light of exposure lamp 41 reflected from the image plane of the document is directed towards lens 43 and photoelectric conversion element 44 through mirrors 42a–42c. Lens 43 provides the light reflected from the image plane of the document towards photoelectric conversion element 44 to form an image at the light receiving plane. Photoelectric conversion element 44 outputs a signal according to the received amount of light at the light receiving plane. The signal output from photoelectric conversion element 44 is applied to the image processing unit that will be described afterwards.

Laser recording unit 32 includes an image formation process unit 47 and a sheet transportation unit 50. Image formation process unit 47 forms an image by electrophotography according to image data subjected to a predetermined image process at the image output unit. To this end, image formation process unit 47 includes a laser write unit 46 projecting a laser beam according to image data, and a corona charger, a developing device, a transfer device, a cleaner and a discharger arranged around photoconductor drum 48.

Sheet transportation unit 50 includes a sheet transportation path 55 from sheet cassettes 51 and 52, an intermediate tray 53 and a manual feed tray 54 through image formation process unit 47 to a post process device 34 attached at one side of digital copy machine 30. A fixture roller 49 is arranged together with a sheet feed roller and transportation belt at this sheet transportation path 55. At the downstream of fixture device 49 in sheet feed transportation path 55, a sheet retransportation path 58 is formed that provides the sheet on which an image is formed on one side passing through image formation process unit 47 and fixture device 49 to intermediate tray 53 directly or with the surface reversed. It is to be noted that three or more sheet cassettes can be provided.

In the image formation process at laser record unit 32, photoconductor drum 48 is rotated at a constant rate in the direction of the arrow. The surface of photoconductor drum 48 is uniformly applied with charge of a single polarity by the corona charger, and then irradiated with the laser beam according to image data from laser write unit 46. Accordingly, an electrostatic latent image is formed at the surface of photoconductor drum 48 by the photoconductive action. The electrostatic latent image is developed into a toner image by the toner supplied from the developing device. Sheet transportation unit 50 has a sheet supplied from sheet cassettes 51, 52, intermediate tray 53 or manual feed tray 54 prior to rotation of photoconductor drum 48. The supplied sheet is directed to the region between photoconductor drum 48 and the developing device in synchronization with the rotation of photoconductor drum 48. The transfer device transfers the toner image on the surface of photoconductor drum 48 onto the surface of the sheet.

The surface of photoconductor drum 48 is then arranged opposite the transfer device, and has the remaining toner removed by the cleaner and the remaining charge removed by the discharger, and then applied with charge again by the corona charger. The sheet on which the toner image is transferred receives heat and pressure by fixture device 49 to have the toner image fixed. Then, the sheet is transferred to post process device 34 or sheet retransportation path 58.

Figure 2:
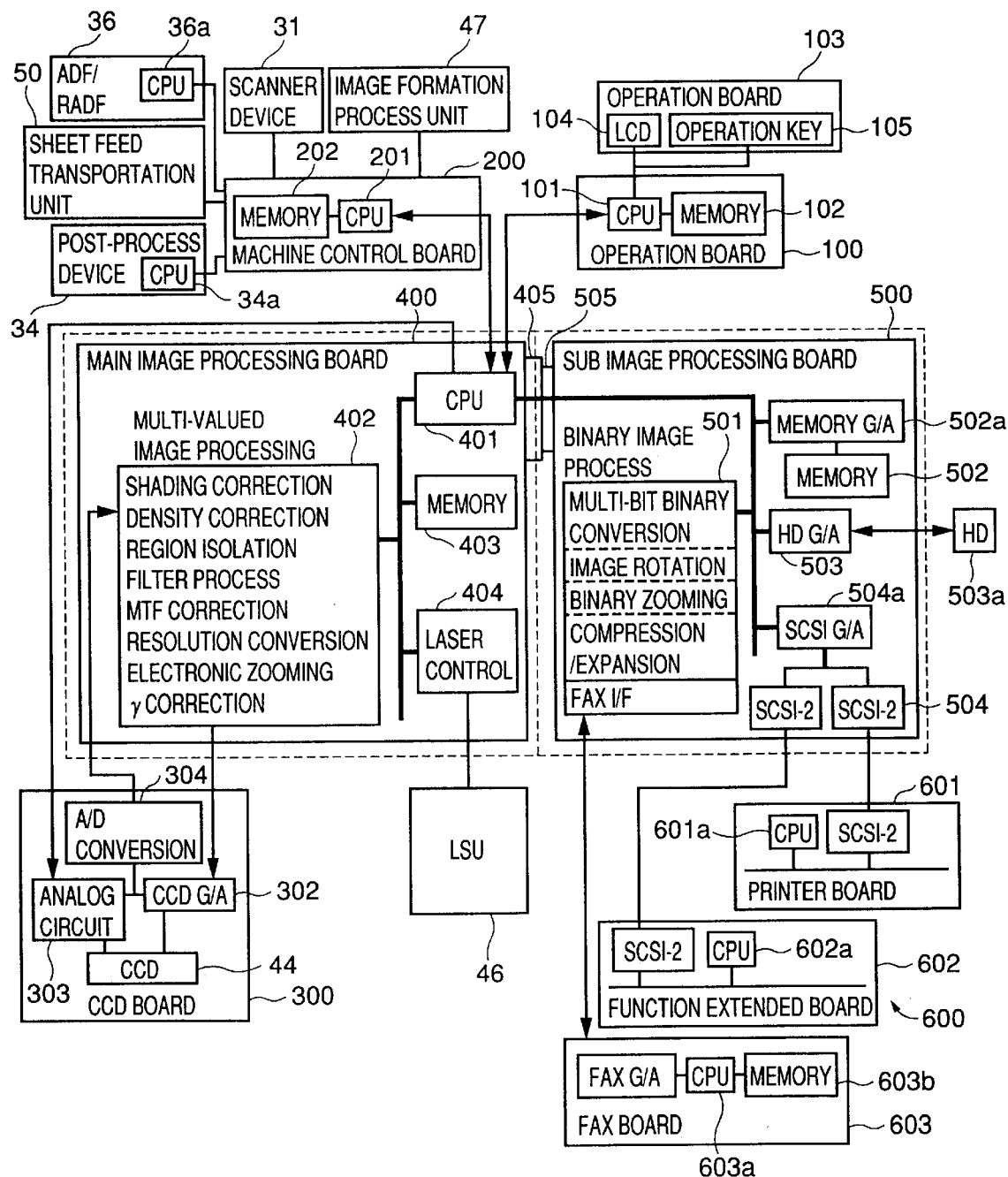
FIG. 2 is a block diagram showing a structure of a control unit of the digital copy machine of FIG. 1.

FIG. 2 is a block diagram showing a structure of the control unit of the digital copy machine. The control unit of digital copy machine 30 controls the operation of the devices provided in each unit via sub CPUs 34a, 36a, 101, 201, 203a, 601a, 602a and 603a mounted on the board provided for each unit.

The control unit of digital copy machine 30 includes an operation panel board 100 controlling a LCD 104 and an operation key 105 arranged at an operation panel 103, a machine control board 200 for controlling the devices provided at scanner device 31, post process device 34, automatic document feeder 36, image formation process unit 47, and sheet transportation unit 50, a CCD board 300 producing image data from the received light signal of photoelectric conversion element (CCD) 44 provided at scanner device 31, a main image processing board 400 applying a multi-value image process on the image data produced at CCD board 300, a sub image processing board 500 applying a binary image process on the image data subjected to the multi-valued process at main image processing board 400, and an extended board 600 formed of a function extended board 602 and a FAX board 603.

Operation panel board 100 is mounted with sub CPU 101 including a memory 102 to control LCD 104 and operation key 105 arranged at operation panel 103 by sub CPU 101. More specifically, CPU 101 reads the operation data of operation key 105 and provides the data to main CPU 401, and displays the data from main CPU 401 at LCD 104. Sub CPU 101 temporarily stores the data sent/received to/from main CPU 401 in memory 102. Accordingly, the setting by the operator through operation key 105 is transmitted to main CPU 401, and the operating state and setting state of digital copy machine 30 are displayed at LCD 104.

Machine control board 200 is mounted with sub CPU 201 including a memory 202. Sub CPU 201 provides control of the sheet transportation operation at sheet transportation unit 50, the image formation operation at image formation process unit 47, the image read out operation by scanner device 31, the document feed operation by automatic document feeder 36, and the post-process operation on the sheet by post-process device 34, according to the control data supplied from main CPU 401. Sub CPU 201 sends data representing the operating state of these devices to main CPU 401.

CCD board 300 is mounted with a CCD gate array 302 driving a CCD 44, an analog circuit 303 adjusting the gain of the signal output from CCD 44, and an A/D converter 304 converting the analog signal output from CCD 44 into multi-bit digital data. CCD gate array 302, analog circuit 303 and A/D converter 304 are controlled by main CPU 401, whereby image data according to the signal output from CCD 44 is supplied to main image processing board 400.

Main image processing board 400 is mounted with main CPU 401, a multi-valued image processing unit 402, a memory 403 and a laser control unit 404. Multi-valued image processing unit 402 and laser control unit 404 are controlled by main CPU 401. Multi-valued image processing unit 402 applies an image process such as shading correction, density correction, region isolation, filtering, MTF correction, resolution conversion, electronic zooming, and γ correction on the multi-valued image data output from CCD board 300, and corrects the tone of the image to reproduce the image of the document in fidelity. Memory 403 stores the image processing procedure and processed image data. Laser control unit 404 drives the semiconductor laser of laser write unit 30 according to the processed image data.

Sub image processing board 500 is connected to main image processing board 400, and mounted with a binary image processing unit 500, a memory 502, a RDH gate array 503, and a SCSI interface 504. These elements are controlled by main CPU 401. Binary image processing unit 501 converts the multi-valued image data subjected to image processing at multi-valued image processing unit 402 of main image processing board 400 into binary image data, and applies the process of image rotation, binary zooming, compression/expansion and the like on the binary image data. Binary image processing unit 501 includes a FAX interface supplying image data to a FAX board 603.

Memory 502 stores image data to be image-processed via gate array 502a and the processed image data. RDH gate array 503 has the image data of a plurality of documents stored in a hard disk 503a for repetition corresponding to the number of set copies, and reads out the image data from hard disk 503a. SCSI interface 504 inputs/outputs image data from/to printer board 601 and a function extended board 602 via SCSI gate array 504a.

Printer board 601 of extended board 600 receives image data input from an external device in a printer mode to form an image according to image data produced at an external device other than the personal computer. Function extended board 602 extends the editorial function of digital copy machine 30. FAX board 603 receives/transmits through a public switched telephone network the image data of a document read by image reader 4 or the image data from which an image to be formed at an image formation unit 3 with an external FAX apparatus.

In the copy mode operation of digital copy machine 30, the plurality of documents placed on the document tray of automatic document feeder 36 are supplied to document platen 35 one at a time. Scanner device 31 reads out the image of the document. The 8-bit image data read out by scanner device 31 is transmitted to main image processing board 400 from CCD board 300. The 8-bit image data sent to image processing board 400 is subjected to a predetermined image process by a multi-valued image processing unit 402 and then supplied to laser write unit 46 via laser control unit 404. Accordingly, the image of the original is formed on a sheet as a copy image with gradation at image formation processing unit 47.

Digital copy machine 30 includes the electronic RDH function of the copy mode. In the copy mode using this electronic RDH function, the 8-bit image data subjected to a predetermined image process by multi-valued image processing unit 402 is sent to sub image processing board 500. The image data is subjected to an error diffusion process and the like at binary image processing unit 501 and converted into image data of 1 bit. Accordingly, the image data of the document is stored in a compressed state in hard disk 503a corresponding to each document without degradation in picture quality. When the image read out process is completed for all the documents set at the document tray of automatic document feeder 36, the image data of one bit stored in hard disk 503a is repeatedly read out for every number of copies, and then supplied to laser write unit 46 via laser control unit 404 of main image processing board 400.

In the case where digital copy machine 30 is used as a printer, the image data send from an external device such as a personal computer is transferred as page image at printer board 601, and then stored in hard disk 503a connected to sub image processing board 500 without being subjected to a binary image process. At the completion of image data reception from the external device, the image data stored in hard disk 503a is read out in a predetermined page sequence, and subjected to a predetermined image process at main image processing board 400. Then, the processed data is supplied to laser write unit 46 via laser control unit 404.

When digital copy machine 30 is used as a facsimile apparatus, the process of sending image data to the destination facsimile apparatus and the process of receiving image data sent from the source facsimile apparatus to form an image are known. When image data of a document is to be sent to the destination facsimile apparatus, the image of the document read out by scanner device 31 is applied to main image processing board 400 as image data of 8 bits from CCD board 300. The 8-bit image data is subjected to a predetermined image process at multi-valued image processing unit 402. The processed 8-bit image data is applied to sub image processing board 500. The data is subjected to an error diffusion process at binary image processing unit 501, and then converted into image data of 1 bit to be stored in hard disk 503a. Then, when a communication state is established with the destination party, image data of 1 bit stored in hard disk 503a is transferred to FAX board 603 to be subjected to the required process such as compression format modification and the like. Then, the processed data is sequentially transmitted via the public switched telephone network.

In the case of receiving facsimile data, the image data transmitted from the source facsimile apparatus is received at FAX board 603 and transferred to sub image processing board 500 via the FAX interface of binary image processing unit 501. Binary image processing unit 501 applies the required process such as compression/expansion on the transferred image data for reproduction as an image corresponding to each page. The image data reproduced as the image in page units is transferred to main image processing board 400 and subjected to an image process such as γ correction at multi-valued image processing unit 402. The processed data is provided to laser write unit 46 from laser control unit 404. Accordingly, image formation processing unit 47 carries out image formation in the facsimile mode.

Figure 3:
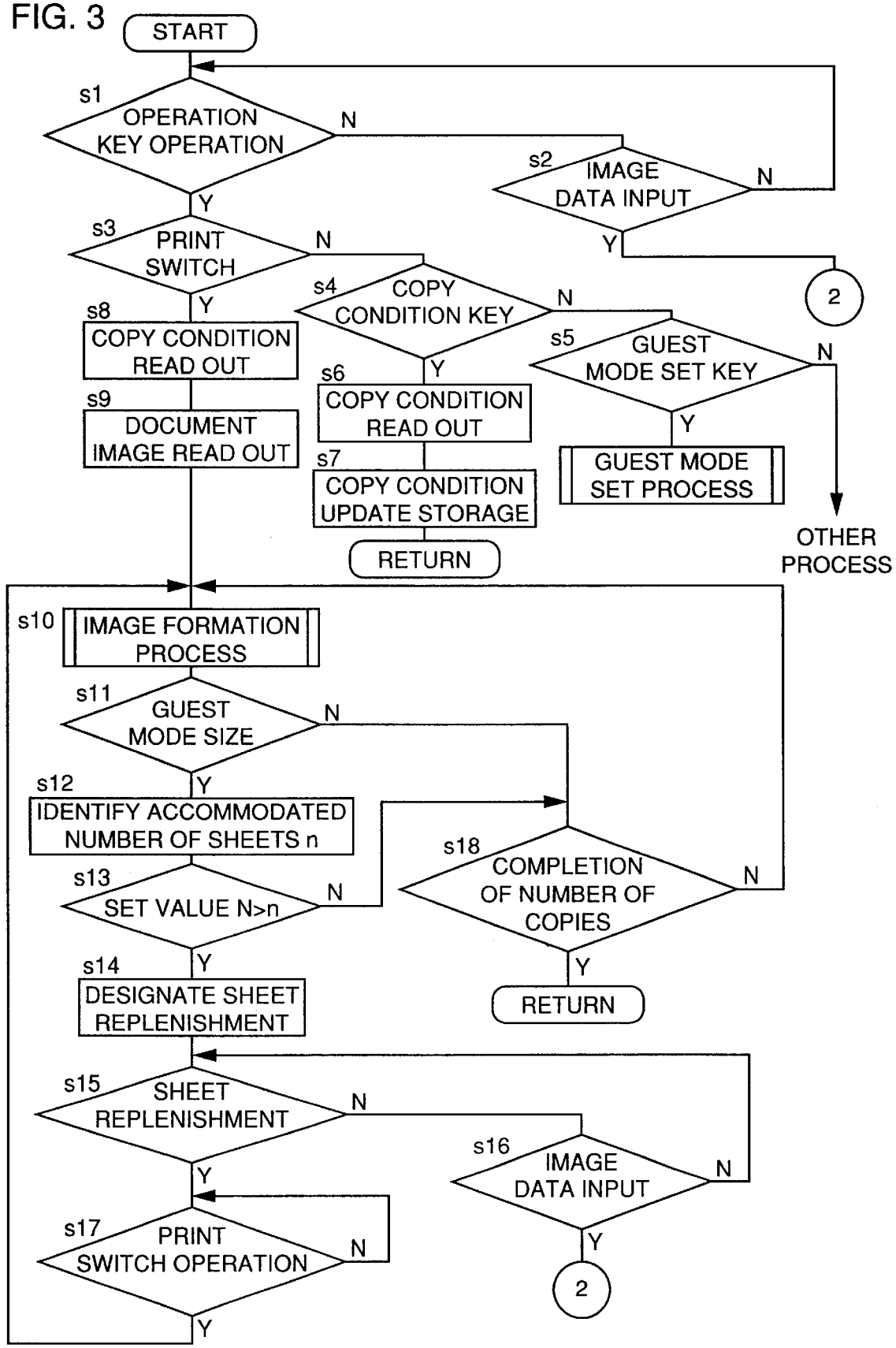
FIG. 3 is a flow chart of the procedure of the main routine by the control unit of a digital copy machine according to a first embodiment of the present invention.
Figure 4:
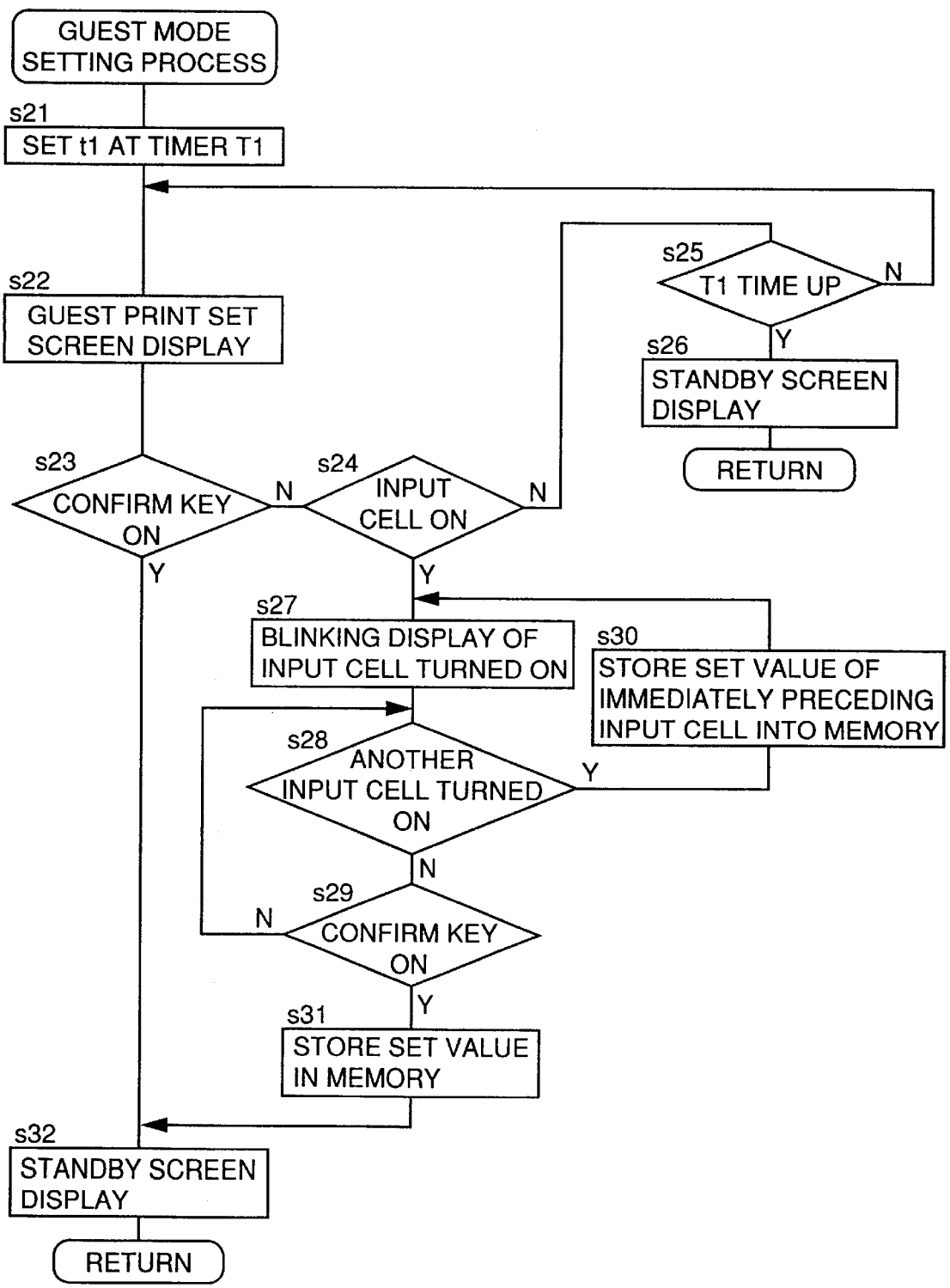
FIG. 4 is a flow chart showing the procedure in setting the guest mode by the control unit of the digital copy machine of FIG. 3.
Figure 5:
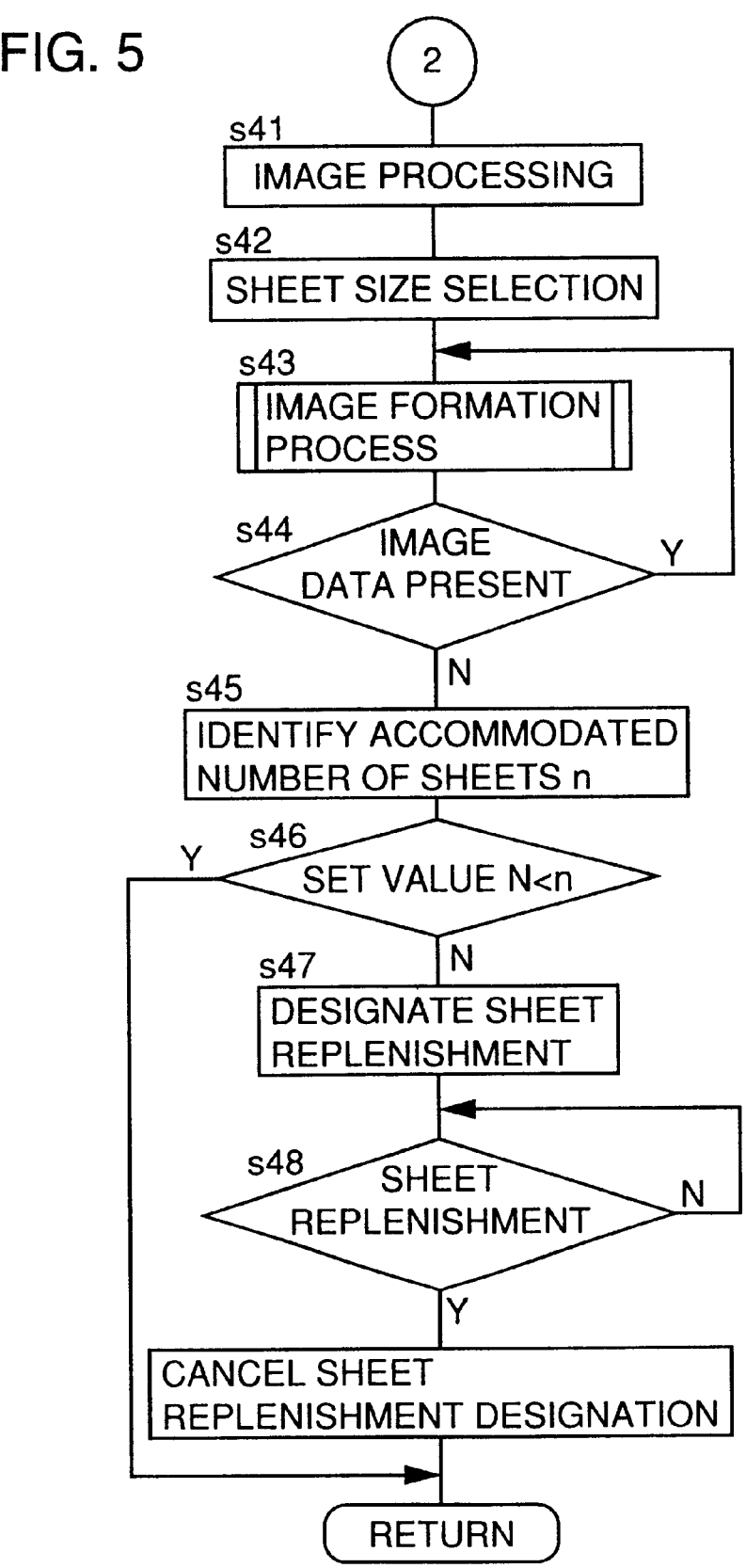
FIG. 5 is a flow chart of the procedure in a guest mode image formation process by the control unit of the digital copy machine of FIG. 3.

FIGS. 3–5 are flow charts of the procedure by the control unit of the digital copy machine according to the first embodiment of the present invention. Main CPU 401 providing the overall control of each device in digital copy machine 30 waits for operation of any operation key 105 arranged at operation panel 103 or input of image data from an external device with respect to printer board 601 or FAX board 603 at completion of the warm up (s1, s2). During this standby, sub CPU 101 of operation panel board 100 forming a part of the control unit provides a display screen corresponding to a standby state shown in FIG. 6 at display 104 provided at operation panel 103. Operation key 105 at operation panel 103 includes a touch panel provided at the surface of display 104.

When the operator depresses any operation key 105, determination is made of which of a print switch that designates initiation of the copy mode formation process, a copy scaling factor to determine the contents of the copy mode image formation process, a copy condition set key to set the copy condition such as the number of copies and the sheet sizes, a guest mode set key setting the condition associated with the guest mode sheet such as the number of sheets to be ensured for provision in the printer mode or facsimile mode image formation process, corresponds to the depressed operation key 105 (s3–s5). The print switch and a portion of the copy condition set key are arranged independently at operation panel 103. The remaining portion of the copy condition set key and the guest mode set key are displayed on the display screen corresponding to a standby state on display 104 shown in FIG. 6.

Figure 6:
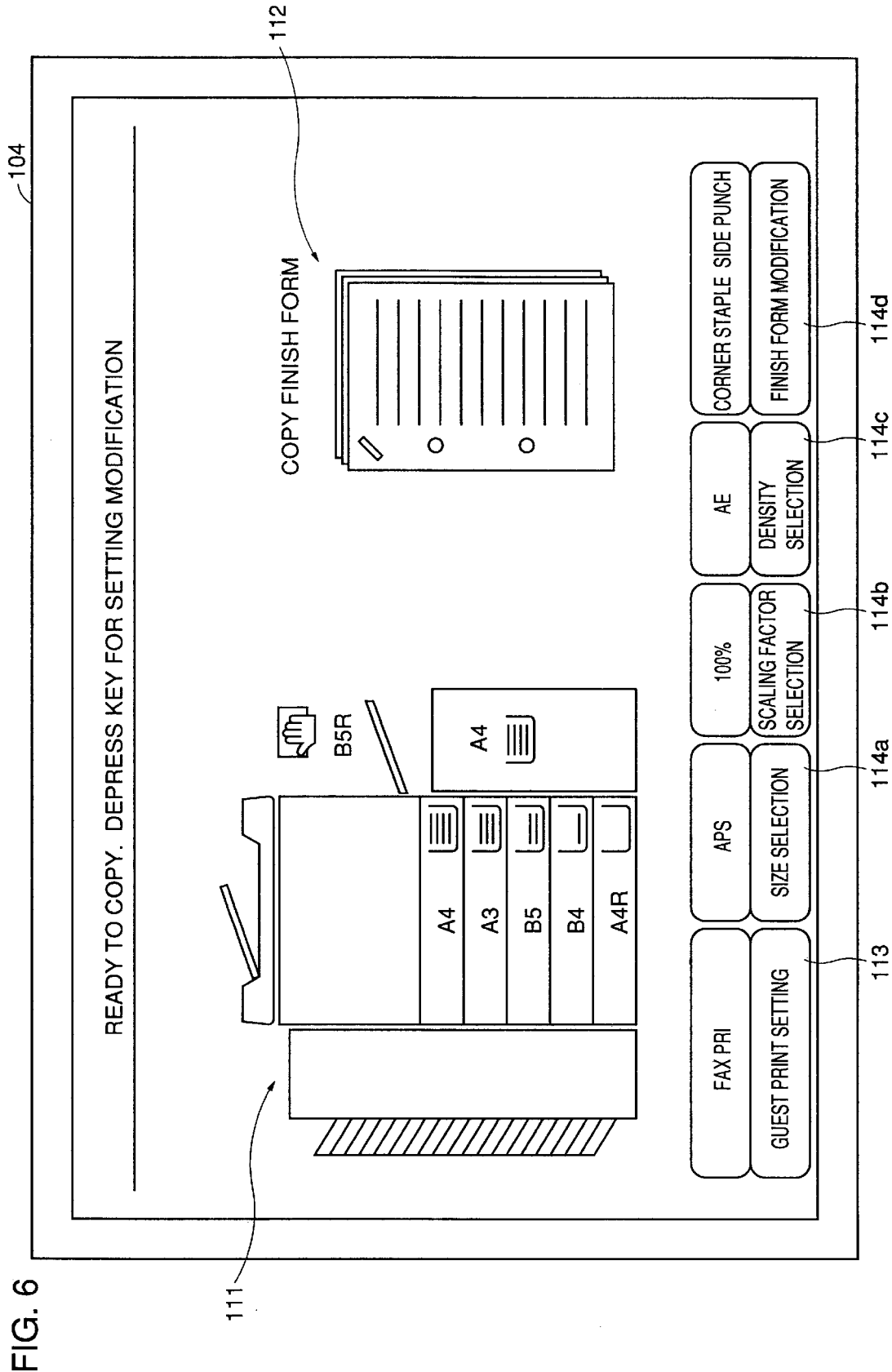
FIG. 6 shows a display screen in a standby state on the display of the digital copy machine of FIG. 3.

More specifically, in the standby state display screen of FIG. 6, an overall outer appearance 111 of digital copy machine 300 is presented at the left side of the screen, and the appearance 112 of the finished state of the sheets by the image formation process is presented at the right side. At the bottom side of the screen, guest mode set key 113 and copy condition set keys 114a–114d are presented.

When a copy condition set key is operated, sub CPU 101 reads the newly set copy condition according to the operation data of the copy condition set key, and stores the new data in memory 102, whereby memory 102 is updated (s6, s7). When the guest print set key is operated, sub CPU 101 executes the guest mode set process shown in FIG. 4. In this process, sub CPU 101 sets a predetermined time t1 at a timer T1 allocated at a predetermined area in memory 102 (s21). The display screen for the guest print setting is provided on display 104 (s22).

Figure 7:
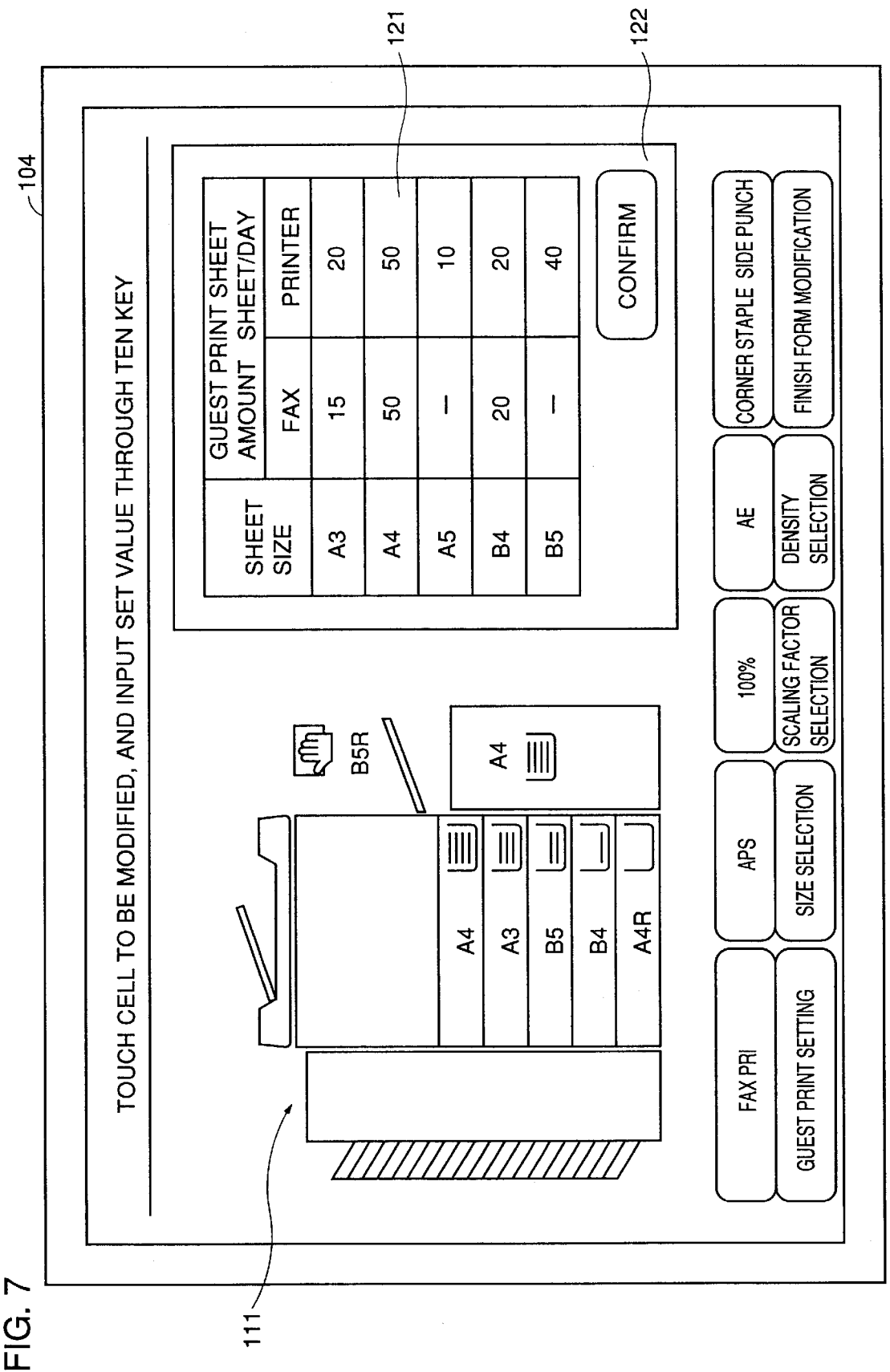
FIG. 7 shows a display screen in setting a guest mode on the display of the digital copy machine of FIG. 3.

Referring to FIG. 7, respective positions of a plurality of sheet cassettes and the size of the sheet accommodated therein are shown in the schematic appearance 111 of digital copy machine 30 at the left side of the guest print set display screen. At the light side of that display screen, a plurality of input cells 121 receiving the setting input of the number of sheets to be ensured for provision in the image formation process of the FAX mode and the printer mode for every sheet size corresponding to the sheets accommodated in respective sheet cassettes mounted in digital copy machine 30 are shown together with the display of a confirm key 122.

The size of the sheet that can be used in respective image formation processes of the facsimile mode and the printer mode are defined in advance. The setting input of the minimum number of sheet to be ensured for provision is accepted at each input cell for each of the sheet size set in advance as to be used in the image formation process of each mode. The setting input for a sheet size that is not set as to be used in the image formation process of respective modes cannot be accepted.

Sub CPU 101 waits for the depression of confirm key 122 or of an appropriate position of any input cell 121 during the time up of timer T1 (s23–s25). When timer T1 expires without a depression of confirm key 122 or input cell 121, the screen is switched to the standby display screen on display 104 to wait for the operation of an operation key on operation panel 103 (s25→s1). When confirm key 122 is operated before the time up of timer T1, determination is made that there is no modification of the setting of the number of sheets to be ensured for provision in the guest mode image formation process, and CPU 101 switches the screen of display 104 to the standby display screen to wait for the operation of an operation key on operation panel 103 (s32→s1).

When any input cell 121 is operated before the time up of timer T1, sub CPU 101 has the operated input cell displayed in a blinking manner to accept input of a set key through the ten-key (s27). Then, waiting is conducted for the depression of another input cell 121 or confirm key 122 (s28, s29). When another input cell 121 is depressed, sub CPU 101 stores the set value of the immediately preceding input cell 121 in a predetermined memory area. The currently-operated input cell 121 is displayed in a blinking manner to prompt input of a set value (s30→s27). When confirm key 122 is depressed, CPU 101 stores the input set value in a predetermined area of memory 102. Then, the standby display screen is presented on display 104 to wait for the operation of an operation key on operation panel 103 (s31→s32→s1).

When the print switch on operation panel 103 is depressed, sub CPU 101 reads out the copy condition stored in memory 102 (s8). An image formation process start instruction is provided to main CPU 401 together with the read copy condition. In response, main CPU 401 reads out the document image via sub CPU 201 in machine control board 200 (s9). An image formation process by a copy mode is executed according to the read document image (s10).

At the end of every one copy mode image formation process, main CPU 401 determines whether a sheet identical in size with that of the sheet to be used in the guest mode image formation process has been fed or not (s11). When a sheet identical in size to that of the sheet that will be used in the guest mode image formation process has been supplied, the accommodated number of sheets n in the sheet cassette that stores the sheet of that size is identified (s12).

The accommodated number of sheets n in the sheet cassette can be identified by detecting the rotating angle of an actuator having one end abutting against the top face of the sheets accommodated in the sheet cassette. A reference position of the sheet top face can be preset at the time of replenishing the sheet cassette with sheets. By sequentially subtracting the number of fed sheets from the accommodated number of sheets n corresponding to the reference position, the current accommodated number of sheets n in the sheet cassette can be identified more accurately.

Main CPU 401 compares the detected accommodated number of sheets n with the set number of sheets N read out through sub CPU 101 (s13). When the accommodated number of sheets n is equal to or less than the set number of sheets N, a message is displayed via CPU 101 on display 104 indicating that sheets are to be supplied for replenishment (s14). Then, main CPU 401 waits for the sheet cassette to be replenished with sheets while waiting for the input of image data associated with the guest mode image formation process from an external device (s15, s16). When the print switch is operated after replenishing the sheet cassette with sheets, the copy mode image formation process is recommended (s17→s10).

When the number of sheets supplied in the copy mode image formation process is not identical in size with that of the sheets set as to be used in the guest mode image formation process, or when the detected value n of the accommodated number of sheets in the sheet cassette storing the sheets of a size identical to that preset as to be used in the guest mode image formation process is equal to or larger than set value N, waiting is conducted for operation of operation key 105 of operation panel 103 subsequent to completion of the copy image formation process for the number of copies set as the copy condition (s11, s13→s18→s1).

When image data associated with the guest mode image formation process is input from an external device via printer board 601 or FAX board 603 in s2 or s16, main CPU 401 executes the guest mode image formation process shown in FIG. 5. In this guest mode image formation process, main CPU 401 executes a predetermined image process on the input image data by main image processing board 400 and sub image processing board 500 (s41). An appropriate sheet size is selected from the sizes of the sheets preset as to be used in the guest mode image formation process according to the size of the image data of one page (s42). An image formation process is executed according to the processed image data with respect to the sheet of the selected size (s43).

When the image formation process is completed for the image data of all input pages (s44), main CPU 401 identifies the accommodated number of sheets n in the sheet cassette (s45). The accommodated number of sheets n is compared with the set number of sheets N (s46). When the value of n is greater than N, control proceeds to s1. When n is equal to or smaller than N, a message indicating that sheet replenishment is required is provided. Following replenishment of the sheet cassette with sheets, waiting is conducted for operation of operation key 105 arranged at operation panel 103 (s47, s48→s1).

According to the above process, the number of sheets to be ensured for provision to be used in the printer mode or facsimile mode image formation process corresponding to the guest mode is set in advance as a set value. When the accommodated number of sheets in the sheet cassette matches the set value during execution of a copy mode image formation process corresponding to the host mode, the host mode image formation process is interrupted and a guest mode image formation process that uses the sheets accommodated in that sheet cassette is accepted. In other words, the sheet cassette in which the accommodated number of sheets becomes as low as the set value by execution of a host mode image formation process is set as the sheet cassette dedicated to the guest mode image formation process. This allows reliable execution of the guest mode image formation process even in the case where the accommodated number of sheets in the sheet cassette storing sheets of the size corresponding to the guest mode image formation process is reduced by execution of the host mode image formation process.

When the accommodated number of sheets in the sheet cassette matches the set value during execution of the host mode image formation process, or when the accommodated number of sheets in the sheet cassette becomes lower than the set value following completion of a guest mode image formation process, initiation of the host mode image formation process can be inhibited until the sheet cassette is replenished with sheets. Accordingly, sheet replenishment can be reliably carried out by the operator who is to execute the host mode image formation process related to the sheet cassette reduced in the accommodated number of sheets.

Figure 8:
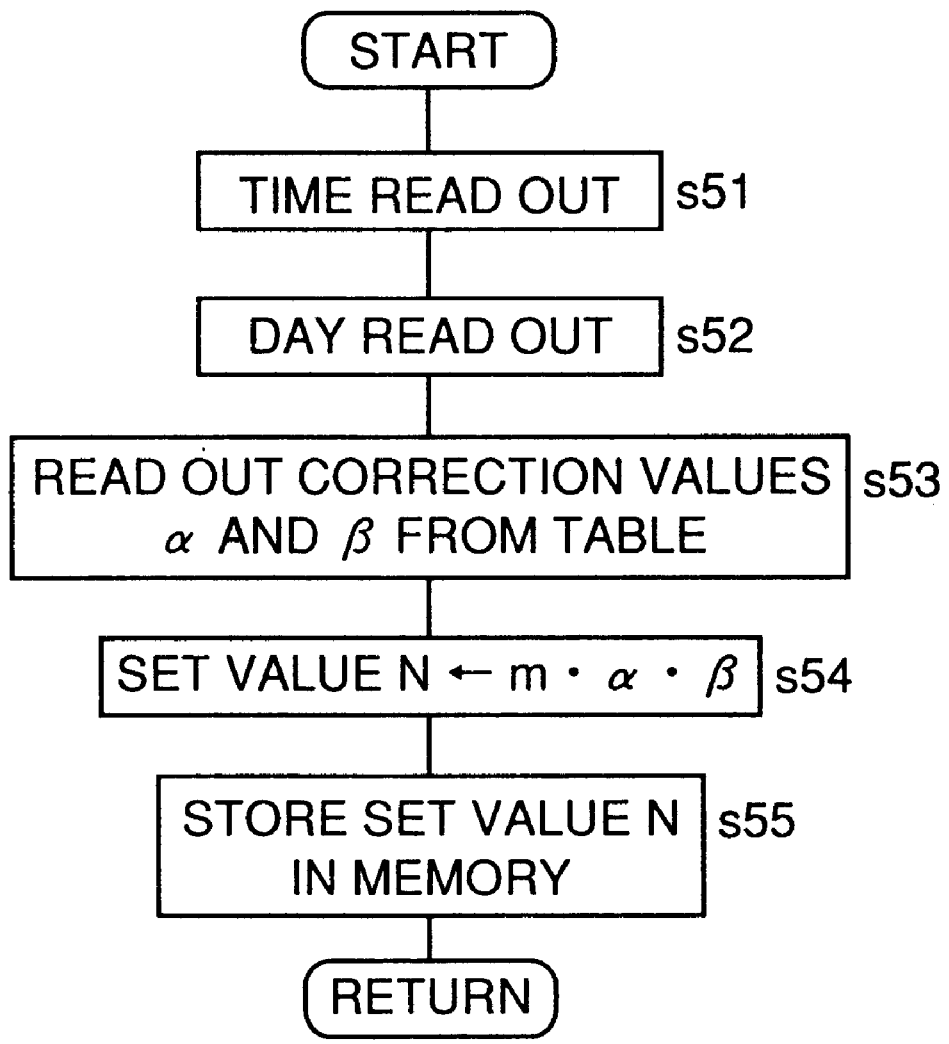
FIG. 8 is a flow chart of a timer interruption process by the control unit of a digital copy machine according to a second embodiment of the present invention.

FIG. 8 is a flow chart showing a portion of the procedure by the control unit of a digital copy machine according to the second embodiment of the present invention. In the digital copy machine of the second embodiment, the set value of the number of sheets to be ensured for provision in the guest mode image formation process can be changed on the basis of usage frequency according to the time zone or the day of the week. To this end, main CPU 401 executes the interruption process of FIG. 8 during the standby for an operation of operation key 105 on operation panel 103. More specifically, main CPU 401 reads the current time and day at a predetermined time interval (s51, s52). Correction values $\alpha$ and $\beta$ corresponding to the read current time and day are read out from a preset table (s53). Main CPU 401 multiplies the read out correction values $\alpha$ and $\beta$ by a preset reference value m to calculate a set value N (s54). The calculated set value N is stored in memory 102 (s55).

Figure 10A:
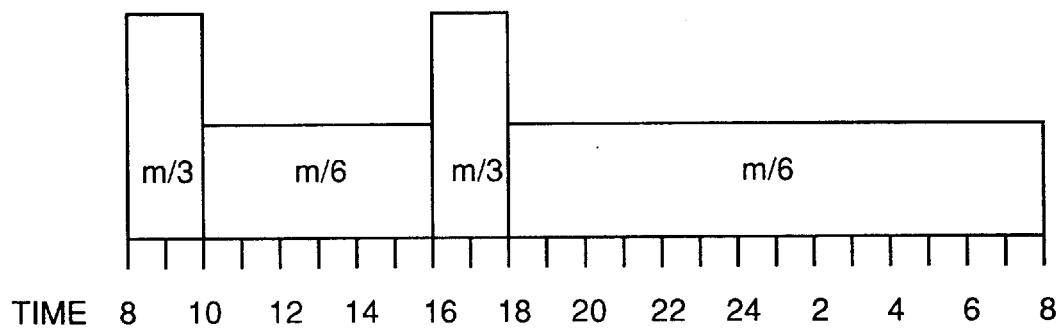
FIGS. 10A and 10B show the corrected result of a set value in the timer interruption process of the digital copy machine of FIG. 8.
Figure 10B:
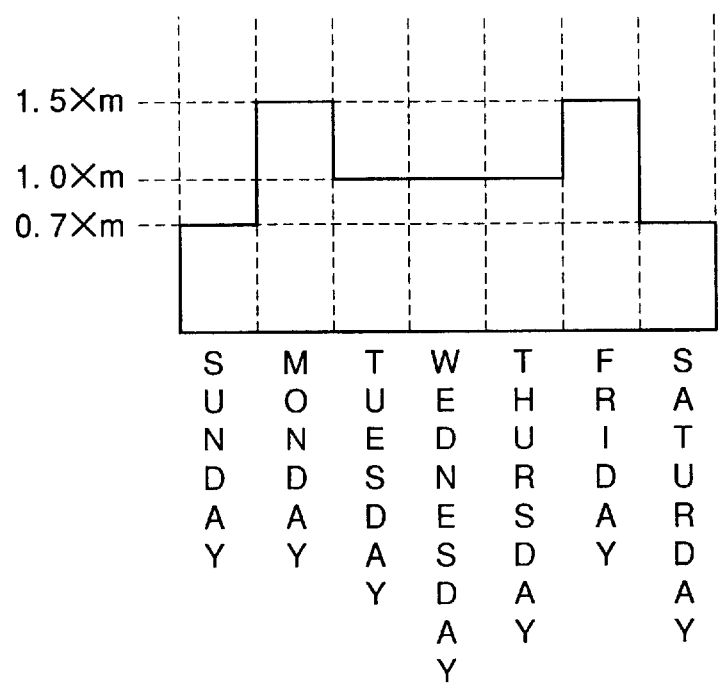

FIGS. 9A and 9B show examples of correction values $\alpha$ and $\beta$, respectively, preset according to the frequency of the guest mode image formation process on the basis of the time zone of one day and the day of one week. By setting such correction values $\alpha$ and $\beta$, the set value of the number of sheets to be ensured for provision as to the guest mode image formation process can be altered according to the usage frequency for every time zone and every day of the week, as shown in FIGS. 10A and 10B.

The correction process of the set value for each of correction values $\alpha$ corresponding to a time zone and $\beta$ corresponding to a day of the week can be executed individually. For example, the correction process by correction value $\beta$ corresponding to a day of the week can be executed only once a day right after the power of digital copy machine 30 is turned on, and the set value subjected to the correction process by correction value $\beta$ can be corrected by correction value $\alpha$ corresponding to the time zone of the current time.

FIG. 11 is a flow chart showing a portion of the processing procedure of the control unit of the digital copy machine according to a third embodiment of the present invention. In the digital copy machine of the third embodiment, the required number of sheets in a copy mode image formation process is calculated according to the set copy condition prior to initiation of that copy mode image formation process. The calculated required number of sheets is subtracted from the accommodated number of sheets prior to initiation of the image formation process and compared with the set value of the number of sheets to be ensured for provision as to the guest mode. Determination is made whether to execute the copy mode image formation process or not according to the comparison result.

More specifically, when the copy condition is set through operation of operation key 105 arranged at operation panel 103 (s61), main CPU 401 calculates the required number of sheets k to be used in the image formation process according to the set copy condition via sub CPU 101 (s62). This required number of sheets k can be calculated by multiplying the number of documents by the set number of copies. Then, main CPU 401 reads out the current accommodated number of sheets n corresponding to the size set by the copy condition (s63). Value k is subtracted from the accommodated number of sheets n. That calculated value is compared with the set value N of the number of sheets to be ensured for provision as to the guest mode image formation process (s64).

When the value of n minus k is smaller than the set value N, main CPU 401 provides a message indicating the need of sheet replenishment on display 104 via sub CPU 401 (s65). Following replenishment of the cassette with the sheets, an input that designates initiation of a copy mode image formation process through operation of the print switch is accepted (s66→s67). When the value of n minus k is equal to or greater than the set number N, main CPU 401 accepts designation of the start of a copy mode image formation process (s64→s67).

Accordingly, in the case where the accommodated number of sheets will become lower than the set value of the number of sheets to be ensured for provision as to the guest mode during execution of the copy mode image formation process, the operator will have to replenish the sheet cassette with sheets prior to initiation of that copy mode image formation process. Thus, the disadvantage of the accommodated number of sheets becoming lower than the set number of sheets to be ensured for provision as to the guest mode image formation process can be reliably prevented.

When the current accommodated number of sheets is read out for all the sizes of sheets mounted in digital copy machine 30 at s63 and when there is a sheet of a size corresponding to that with the value of n minus k being at least the set number of sheets N in the comparison of s64, that sheet size can be selected as the size of a sheet to be used in the copy mode image formation process.

Figure 12:
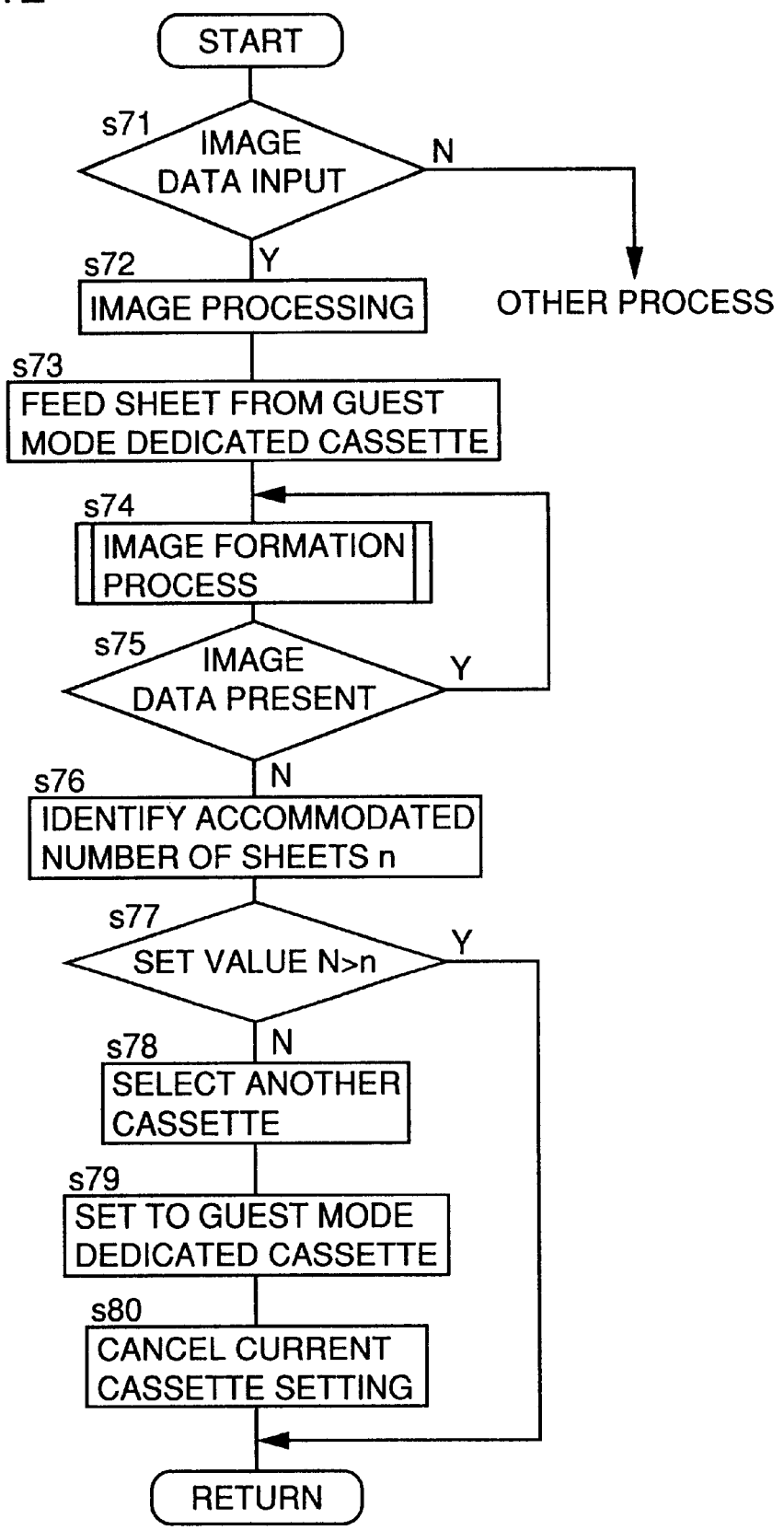
FIG. 12 is a flow chart showing a procedure by the control unit of a digital copy machine according to a fourth embodiment of the present invention.

FIG. 12 is a flow chart showing a portion of the procedure by the control unit of a digital copy machine according to a fourth embodiment of the present invention. In the digital copy machine of the fourth embodiment, any one of the plurality of sheet cassettes mounted in digital copy machine 30 is set as the sheet cassette dedicated to the guest mode image formation process. When the accommodated number of sheets in the sheet cassette dedicated to the guest mode image formation process become equal to or lower than set value N, another sheet cassette mounted in digital copy machine 30 is set as the sheet cassette dedicated to the guest mode image formation process.

More specifically, when image data is input via printer board 601 or FAX board 603 (s71), main CPU 401 applies a predetermined image process on the image data (s72). The sheet is fed from the sheet cassette dedicated to the guest mode image formation process (s73). An image formation process is executed according to the processed image data (s74). Upon completion of the image formation process, main CPU 401 identifies the accommodated number of sheets n in the dedicated sheet cassette (s75, s76). The identified value n is compared with the set value n of the number of sheets to be ensured for provision as to the guest mode image formation process (s77).

When value n is less than set number N according to the comparison result, main CPU 401 selects another sheet cassette that accommodates at least N sheets of a size identical to that of the sheet stored in the sheet cassette from which a sheet is supplied in the current guest mode image formation process out of the sheet cassettes mounted in digital copy machine 30 (s78). The selected sheet cassette is set as the sheet cassette dedicated to the guest mode image formation process (s79). The setting of the sheet cassette used in the current guest mode image formation process dedicated to the guest mode is cancelled (s80).

Accordingly, when the accommodated number of sheets in the sheet cassette dedicated to the guest mode image formation process becomes lower than the set value N of the number of sheets to be ensured for provision as to the guest mode image formation process, the sheet cassette dedicated to the guest mode image formation process can be switched to another sheet cassette.

In a guest mode image formation process, the operator is generally not present in the proximity of digital copy machine 30 in contrast to the case of the host mode image formation process in which the operator is generally present in the vicinity of digital copy machine 30. When the accommodated number of sheets in the sheet cassette dedicated to the guest mode image formation process becomes lower than the set number of sheets N by execution of the guest mode image formation process, the operator could not usually be aware of that state. Therefore, the sheet cassette dedicated to the guest mode image formation process could not be promptly replenished with sheets. An abundant number of sheets for usage in the subsequent guest mode image formation process could not be ensured.

In contrast, digital copy machine 30 of the present embodiment has the sheet cassette dedicated to the guest mode image formation process switched to another sheet cassette. Therefore, the sheets to be used in the subsequent guest mode image formation process can be ensured for provision even if the operator does not replenish the cassette with sheets.

When the sheet cassette dedicated to the guest mode image formation process is switched to another sheet cassette, the accommodated number of sheets in the sheet cassette used for the host mode image formation process will be reduced as a result. However, an operator is generally present in the proximity of digital copy machine 30 in the host mode image formation process. Therefore, the operator can easily be made aware of the insufficient number of sheets to promptly supply the sheets for replenishment. Thus, the host mode image formation process will not be significantly deferred.

In switching the sheet cassette dedicated to the guest mode image formation process, the sheet cassette corresponding to the identical type and size can be selected out of the other sheet cassettes mounted in digital copy machine 30. The accommodated direction of the sheets does not necessarily have to be identical. More specifically, there are sheets that can be fed in two directions orthogonal to each other such as A4 size or B5 size sheets. Such sheets may be accommodated in the sheet cassette with the longer side of the sheet matching the sheet feed direction or the shorter side of the sheet matching the sheet feed position. By applying a 90°-rotation process on the input image data, setting of the sheet cassette dedicated to the guest mode image formation process can be switched even between sheet cassettes having sheets accommodated in different directions.

Figure 13:
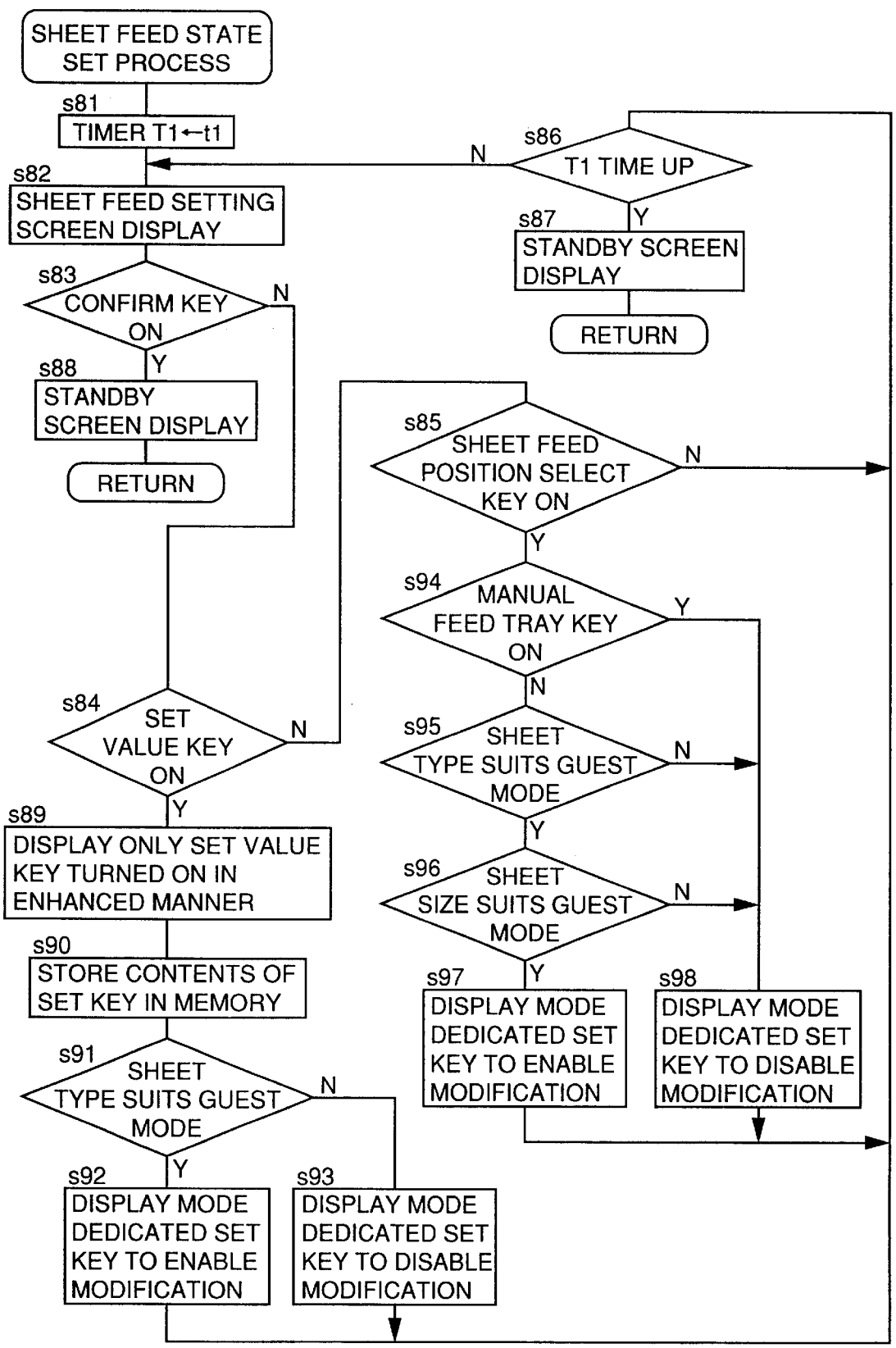
FIG. 13 is a flow chart of the procedure of the sheet feed state setting process by the control unit of the digital copy machine of FIG. 12.
Figure 14:
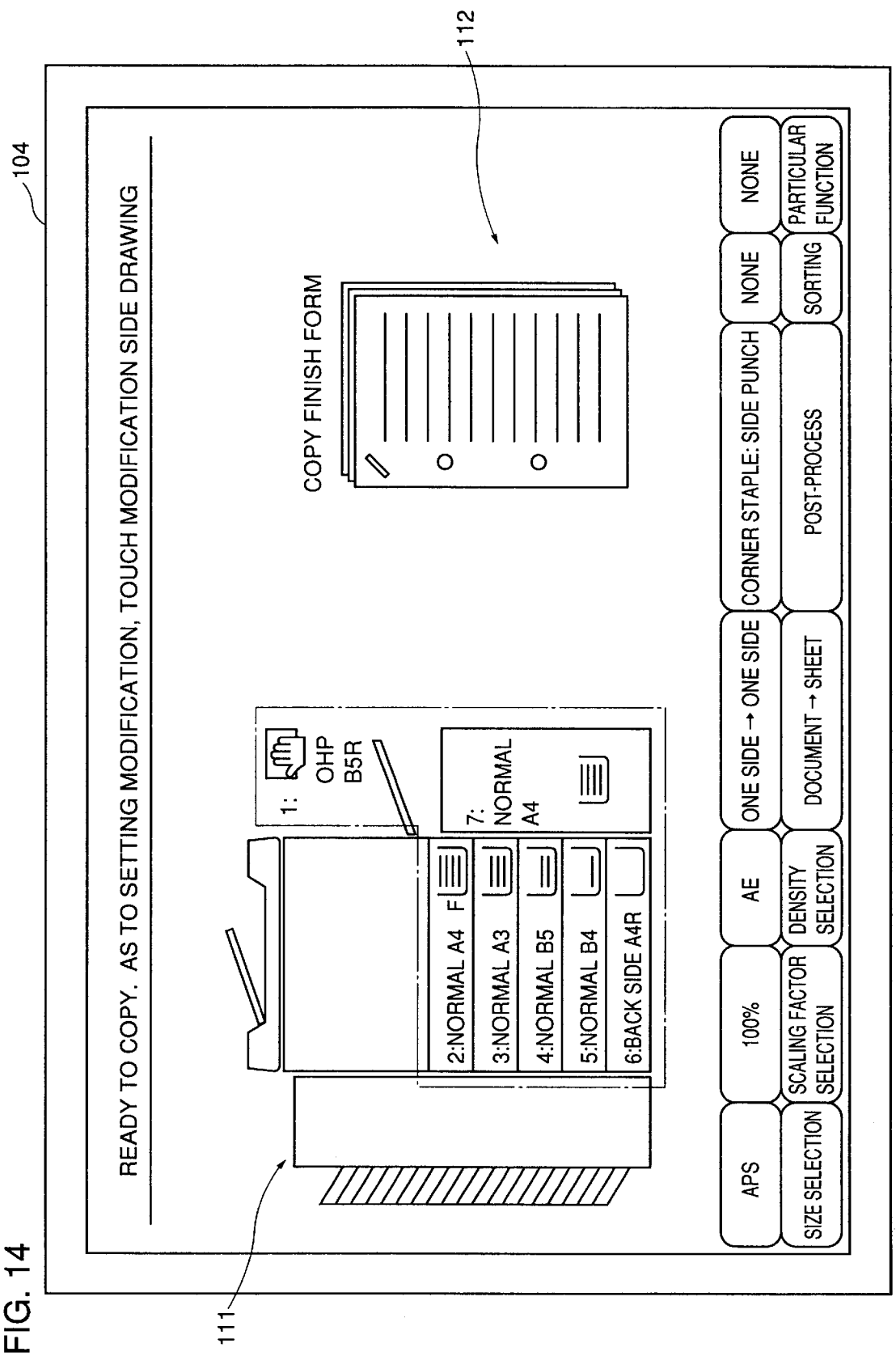
FIG. 14 shows a display screen in a standby state on the display of the digital copy machine of FIG. 12.

Initial setting of the sheet cassette dedicated to the guest mode image formation process in the digital copy machine of the present fourth embodiment can be carried out by a sheet feed state set process according to the flow chart of FIG. 13. More specifically, during the standby of a depression of operation key 105 on operation panel 103, sub CPU 101 provides the standby display screen shown in FIG. 14 on display 104 of operation panel 103. In this standby display screen, the schematic appearance 111 of the digital copy machine is presented at the left side, and the finishing state 112 of the sheet after the image formation process is represented at the right side. In appearance 111 of the digital copy machine, the type and size of respective sheets stored in the plurality of sheet feed positions are indicated. When a portion corresponding to any of a plurality of sheet feed positions in appearance 111 of the digital copy machine is depressed at the surface of display 104 on which the standby display screen of FIG. 14 is provided, sub CPU 101 executes the sheet feed state set process of FIG. 13.

Figure 15:
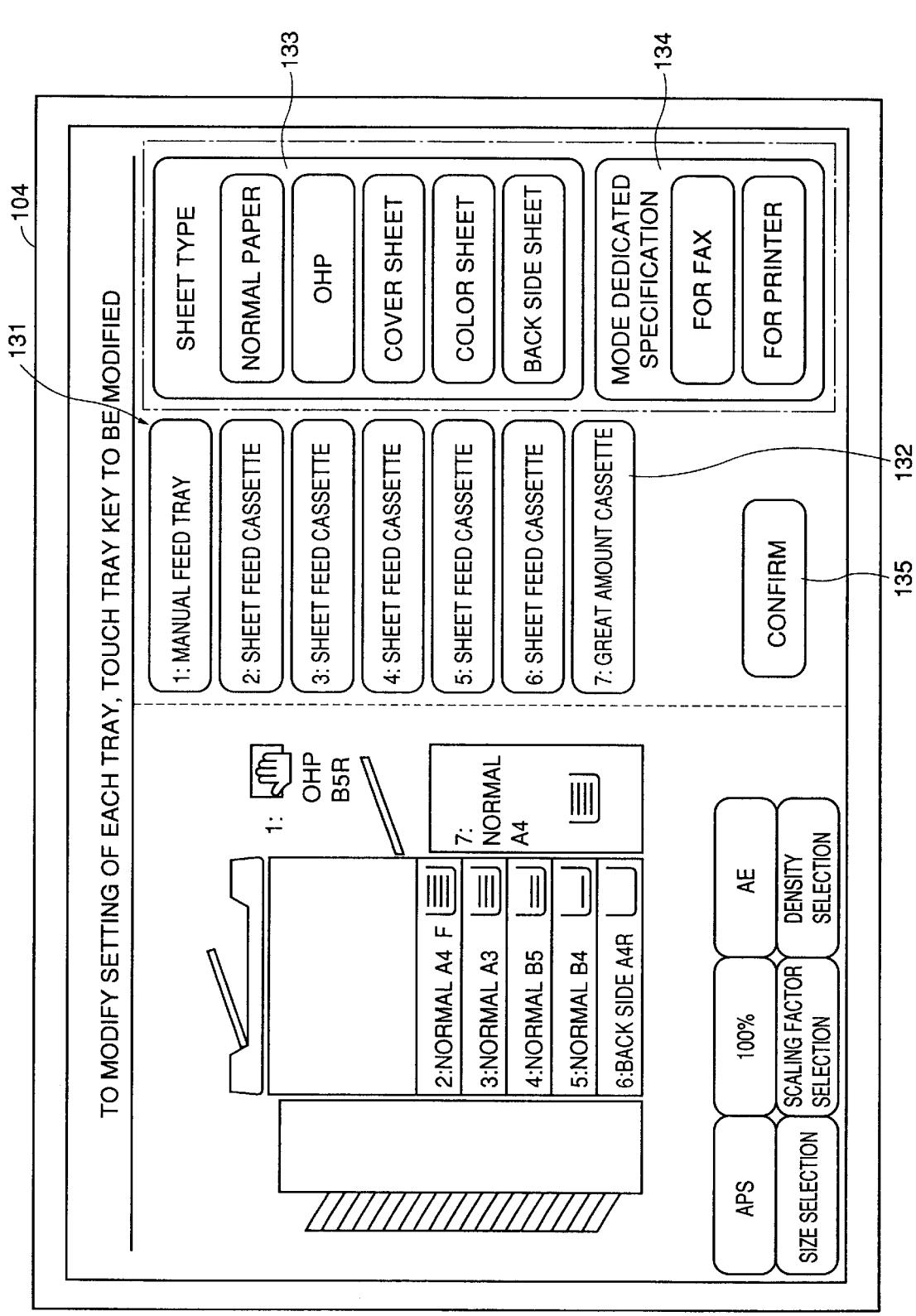
FIG. 15 shows a set screen of a sheet feed state on the display of the digital copy machine of FIG. 12.

In this setting process, sub CPU 101 sets a predetermined time t2 for timer T1 (s81). A sheet feed state setting screen 131 shown in FIG. 15 is presented at the right side of the display screen on display 104 (s82). In sheet feed state setting screen 131, a plurality of sheet feed position select keys 132, a plurality of sheet type set keys 133, two mode dedicated set keys 134, and one confirm key 135 are provided. The sheet feed position select key accepts selection of a sheet feed position that is the object of setting by the sheet type set key and mode dedicated set key. The sheet type set key receives selection of the type of the sheet to be accommodated at the sheet feed position identified by the sheet feed position select key displayed in an enhanced manner. The mode dedicated set key accepts the setting of the sheet feed position identified by the sheet feed position select key that is displayed in an enhanced manner as the sheet feed position dedicated to the image formation process of either the facsimile mode or the printer mode. The confirm key is operated in ascertaining the contents of the sheet type set key and the mode dedicated set key that are displayed in an enhanced manner with respect to the sheet feed position identified by the sheet feed position select key.

In the sheet feed state setting screen of FIG. 15, the sheet feed position identified by the sheet feed position select key displayed in an enhanced manner is active for the setting process of the sheet. The screen of FIG. 15 indicates that the sheet type identified by the sheet type set key and the mode identified by the mode dedicated set key are set.

During the time up of timer T1, sub CPU 101 waits for the operation of the confirm key, the sheet feed position select key, the sheet type set key or the mode dedicated set key (s83–s86). When timer T1 expires or when the confirm key is operated, the standby display screen of FIG. 14 is provided on the display to return to the standby state (s87, s88). When the sheet type set key or the mode dedicated set key is operated, sub CPU 101 displays the operated set key in an enhanced manner (s89). The contents of the set key are stored in the memory for update (s90).

When the sheet type set key is operated, sub CPU 101 determines whether the set sheet type suits the guest mode image formation process (s91). When the set sheet type suits the guest mode image formation process, the mode dedicated set key is displayed in a manner that can be operated (s92). When the set sheet type does not suit the guest mode image formation process, the mode dedicated set key is displayed in a manner that cannot be operated (s93). When a color sheet or a back side sheet is set in the case where a normal sheet is preset as the type of sheet that can be used in the guest mode image formation process, setting dedicated to the printer mode or the facsimile mode through the mode dedicated set key is not accepted.

When the sheet feed position select key is operated, sub CPU 101 determines whether the manual feed tray is selected or not, whether the sheet type set at the selected sheet cassette suits the guest mode image formation process, and whether the sheet size set at the selected sheet cassette suits the guest mode image formation process (s94–s96). When the sheet type and size set at the selected sheet cassette suit the guest mode image formation process, sub CPU 101 displays the mode dedicated set key in an inoperable state (s97). When the manual feed tray is selected as the sheet feed position or when the sheet type or size set at the selected sheet cassette does not match the guest mode image formation process, the mode dedicated set key is displayed in a disabled state (s98).

At s93 and s98, the mode dedicated set key is displayed visually in an unconfirmable state such as in half tone characters.

Accordingly, in the case where the sheet type and size that can be used for the guest mode image formation process are preset in the setting process of a sheet feed position dedicated to the guest mode image formation process, any setting of a sheet feed position corresponding to a sheet of the type or size that does not match the guest mode image formation process can be prevented reliably.

In the first to fourth embodiments, the setting dedicated to the guest mode as to the sheet feed position can be changed according to the comparison result between the accommodated number of sheets at the sheet feed position with the set number of sheets to be ensured for provision as to the guest mode. The sheet feed position dedicated to the guest mode is not fixedly set. Therefore, the sheet accommodated at a sheet feed position can be used effectively for both the image formation process of the host mode and the guest mode according to the usage of the sheet.

Particularly in the first embodiment, when the accommodated number of sheets at the sheet feed position becomes as low as the set number of sheets to be ensured for provision as to the guest mode image formation process due to the usage of the sheets in a host mode image formation process or a guest mode image formation process, that sheet feed position can be set as the sheet feed position dedicated to the guest mode. Therefore, the number of sheets corresponding to the set number of sheets to be ensured for provision as to the guest mode image formation process subtracted from the initial accommodated number of sheets at the sheet feed position can be used for the image formation process of the host mode and the guest mode, and the set number of sheets to be ensured for provision as to the guest mode image formation process can be used for only the guest mode image formation process. Therefore, a sufficient number of sheets can always be ensured for provision as to the guest mode image formation process in which the cassette cannot be replenished with sheets easily by the operator.

According to the fourth embodiment, when the accommodated number of sheets at the sheet feed position dedicated to the guest mode is used in the guest mode image formation process to become as low as the set number of sheets, the remaining sheets are used only for the host mode image formation process, and another sheet feed position is set as the sheet feed position dedicated to the guest mode. Therefore, the sheet feed position reduced in the accommodated number of sheets can be used for the host mode image formation process where sheet replenishment can be effected easily. Also, the sheet feed position in which a large number of sheets are accommodated can be used for the guest mode image formation process in which sheet replenishment is not readily carried out.

In the second embodiment, the setting dedicated to the guest mode as to the sheet feed position can be changed on the basis of a different number of set sheets according to a time zone. Even in the case where the number of sheets to be used in the guest mode image formation process differs according to the time zone, sheets accommodated at a sheet feed position can be used for the host mode image formation process in the range where sufficient number of sheets are always ensured for provision as to the guest mode image formation process without regard to the time zone.

According to the second embodiment of the present invention, the setting dedicated to the guest mode as to the sheet feed position can be changed on the basis of different set number of sheets according to the day of a week. Even in the case where the number of sheets to be used in the guest mode image formation process differs according to the day of the week, sheets accommodated at the sheet feed position can be used for the host mode image formation process in the range where a sufficient number of sheets are always ensured for provision as to the guest mode without regard to the day of the week for the image formation process of the guest mode.

According to the third embodiment of the present invention, determination is made whether the accommodated number of sheets after execution of the host mode image formation process becomes lower than the set number of sheets to be ensured for provision as to the guest mode image formation process, prior to initiation of the host mode image formation process. By designating the requirement of sheet replenishment according to the determination result, sheets can be reliably supplied for replenishment prior to initiation of the host mode image formation process in the case where the accommodated number of sheets will become lower than the set number of sheets to be ensured for provision as to the guest mode image formation process by execution of the host mode image formation process. Therefore, a sufficient number of sheets can be ensured for provision as to the guest mode image formation process.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image formation apparatus selectively executing a host mode image formation process according to image data input from a particular device and a guest mode image formation process according to image data input from a device other than said particular device as to a sheet accommodated at a sheet feed position,
wherein a set state dedicated to a guest mode in which the sheet accommodated at said sheet feed position can be used only for the guest mode image formation process is altered according to a comparison result between the accommodated number of sheets at said sheet feed position and the number of sheets to be ensured for provision as to the guest mode image formation process.

2. The image formation apparatus according to claim 1, wherein, when the accommodated number of sheets at a unitary or a plurality of sheet feed positions becomes as low as a set number of sheets to be ensured for provision as to the guest mode image formation process, that sheet feed position is set as the sheet feed position dedicated to the guest mode.

3. The image formation apparatus according to claim 1, wherein, when the accommodated number of sheets at the sheet feed position set exclusively for the guest mode out of the unitary or plurality of sheet feed positions becomes as low as the set number of sheets to be ensured for provision as to the guest mode image formation process, setting of the sheet feed position dedicated to the guest mode is switched to another sheet feed position.

4. The image formation apparatus according to claim 1, wherein said set number of sheets to be ensured for provision as to said guest mode image formation process is set variable according to a time zone.

5. The image formation apparatus according to claim 2, wherein said set number of sheets to be ensured for provision as to said guest mode image formation process is set variable according to a time zone.

6. The image formation apparatus according to claim 3, wherein said set number of sheets to be ensured for provision as to said guest mode image formation process is set variable according to a time zone.

7. The image formation apparatus according to claim 1, wherein said set number of sheets to be ensured for provision as to said guest mode image formation process is set variable according to a day of a week.

8. The image formation apparatus according to claim 2, wherein said set number of sheets to be ensured for provision as to said guest mode image formation process is set variable according to a day of a week.

9. The image formation apparatus according to claim 3, wherein said set number of sheets to be ensured for provision as to said guest mode image formation process is set variable according to a day of a week.

10. The image formation apparatus according to claim 4, wherein said set number of sheets to be ensured for provision as to said guest mode image formation process is set variable according to a day of a week.

11. The image formation apparatus according to claim 1, wherein, prior to initiation of a host mode image formation process, the number of sheets to be used in the host mode image formation process is subtracted from the accommodated number of sheets at said sheet feed position, and sheet replenishment for a sheet feed position is designated according to a comparison result between said resultant value of subtraction and said set number of sheets to be ensured for provision as to the guest mode image formation process.

12. The image formation apparatus according to claim 2, wherein, prior to initiation of a host mode image formation process, the number of sheets to be used in the host mode image formation process is subtracted from the accommodated number of sheets at said sheet feed position, and sheet replenishment for a sheet feed position is designated according to a comparison result between said resultant value of subtraction and said set number of sheets to be ensured for provision as to the guest mode image formation process.

13. The image formation apparatus according to claim 3, wherein, prior to initiation of a host mode image formation process, the number of sheets to be used in the host mode image formation process is subtracted from the accommodated number of sheets at said sheet feed position, and sheet replenishment for a sheet feed position is designated according to a comparison result between said resultant value of subtraction and said set number of sheets to be ensured for provision as to the guest mode image formation process.

14. The image formation apparatus according to claim 4, wherein, prior to initiation of a host mode image formation process, the number of sheets to be used in the host mode image formation process is subtracted from the accommodated number of sheets at said sheet feed position, and sheet replenishment for a sheet feed position is designated according to a comparison result between said resultant value of subtraction and said set number of sheets to be ensured for provision as to the guest mode image formation process.

15. The image formation apparatus according to claim 5, wherein, prior to initiation of a host mode image formation process, the number of sheets to be used in the host mode image formation process is subtracted from the accommodated number of sheets at said sheet feed position, and sheet replenishment for a sheet feed position is designated according to a comparison result between said resultant value of subtraction and said set number of sheets to be ensured for provision as to the guest mode image formation process.

* * * * *